(12) United States Patent
Lamstein et al.

(10) Patent No.: US 7,353,773 B2
(45) Date of Patent: Apr. 8, 2008

(54) PET BED WITH CHOPPED MEMORY FOAM FILLER

(76) Inventors: Aaron Lamstein, 160 Mitchell Rd., San Rafael, CA (US) 94903-2044; Wonjung Song, 160 Mitchell Rd., San Rafael, CA (US) 94903-2044; Trish Ottens, 160 Mitchell Rd., San Rafael, CA (US) 94903-2044

( * ) Notice: Subject to any disclaimer, the term of this patent is extended or adjusted under 35 U.S.C. 154(b) by 0 days.

(21) Appl. No.: 11/386,862

(22) Filed: Mar. 22, 2006

(65) Prior Publication Data
US 2007/0220676 A1 Sep. 27, 2007

(51) Int. Cl.
*A47C 27/14* (2006.01)
*A01K 29/00* (2006.01)

(52) U.S. Cl. .................. 119/28.5; 5/420; 5/655.5; 5/502

(58) Field of Classification Search ............ 5/502, 5/645, 482, 413 R, 420, 655.5; 119/28.5
See application file for complete search history.

(56) References Cited
U.S. PATENT DOCUMENTS

| | | | | | |
|---|---|---|---|---|---|
| 1,212,515 | A | * | 1/1917 | Leavitt | 5/636 |
| 2,589,303 | A | * | 3/1952 | Sourbeck | 5/645 |
| 5,187,825 | A | * | 2/1993 | Tesch | 5/502 |
| 6,725,478 | B2 | * | 4/2004 | Birch | 5/502 |
| 7,080,421 | B1 | * | 7/2006 | Delfs | 5/645 |
| 2006/0075562 | A1 | * | 4/2006 | DiGirolamo | 5/645 |

* cited by examiner

*Primary Examiner*—Alexander Grosz

(57) ABSTRACT

A pet bed which is configured from an upper fabric layer and lower fabric layer which are joined at a peripheral edge. The upper and lower fabric layers define the shape of the bedding product wherein a portion of the peripheral edge is selectively closeable to provide an opening for filling the bedding product with a chopped memory foam fill material. A plurality of barriers extend proximate the opening to the length of the upper and lower fabric layers and join the upper and lower fabric layers by, for example, sewing the barriers to them. The barrier layers are of a width approximately equal to the thickness of the bedding product once filled with said chopped memory foam fill material substantially preventing fill material migration between sub volumes created by said barriers.

6 Claims, 2 Drawing Sheets

PET BED WITH CHOPPED MEMORY FOAM FILLER

TECHNICAL FIELD

The present invention deals with a bedding product which is ideally suited for use as a pet bed. Such bedding products oftentimes employ dense fillers such as chopped memory foam made available from recycled chopped or aggregated pieces. The present invention is intended to employ such fill material and yet provide a bedding product vastly improved over those currently available.

BACKGROUND OF THE INVENTION

Bedding products such as those used for pet beds often employ dense recycled memory foam as such products are inexpensive and act as an excellent cushioning layer. If such material is simply placed within a fabric covering, limitations associated with such a bedding product become quickly apparent. For example, if one was to pick the bedding product up by one of its corners in order to move it from one location to another, the filling material would concentrate in the opposite corner producing a pear-shaped cross section.

Recognizing the need to maintain fill material uniformly dispersed across the entire internal volume of the bedding product, the prior art has suggested a structure depicted in FIGS. 1 and 2 hereof. Specifically, pet bed 10 is shown composed of upper fabric layer 12 and lower fabric layer 16 containing fill material 13. In order to maintain fill material 13 in place, longitudinally extending parallel stitching 11 is provided. In this way, regardless of how bedding product 10 is handled, fill material 13 will generally remain in place.

Although, superficially, the bedding product 10 provides somewhat of a "solution" to the problem of fill material migration, bedding product 10 is hardly ideal. Specifically, by providing stitching 11, bedding product 10 inherently presents extended peaks 14 and deep valleys 15 which is not by any means a preferred sleeping surface. Even a pet engaging bedding product 10 would find the undulating surface thereof somewhat uncomfortable causing the pet to oftentimes reject the bedding product in favor of nothing more than a carpeted surface.

It is thus an object of the present invention to provide a bedding product devoid of the limitations of the prior art.

It is yet a further object of the present invention to provide a bedding product which can be used, for example, as a pet bed which substantially prevents fill migration while providing a relatively flat or planar surface to a user.

These and further objects will be more readily apparent when considering the following disclosure and appended claims.

SUMMARY OF THE INVENTION

A bedding product comprising an upper fabric layer, lower fabric layer and a peripheral edge joining said upper and lower fabric layers defining the shape of said bedding product wherein a portion of said peripheral edge is selectively closeable to provide an opening for filling said bedding product with a chopped memory foam fill material. A plurality of barriers are provided extending proximate said opening to the extent of said upper and lower fabric layers and which are joined to said upper and lower fabric layers, the barriers being of a width equal to the thickness of the bedding product once filled with said chopped memory foam fill material substantially preventing fill material migration between sub volumes created by said barriers.

DETAILED DESCRIPTION OF THE INVENTION

Figure 1:
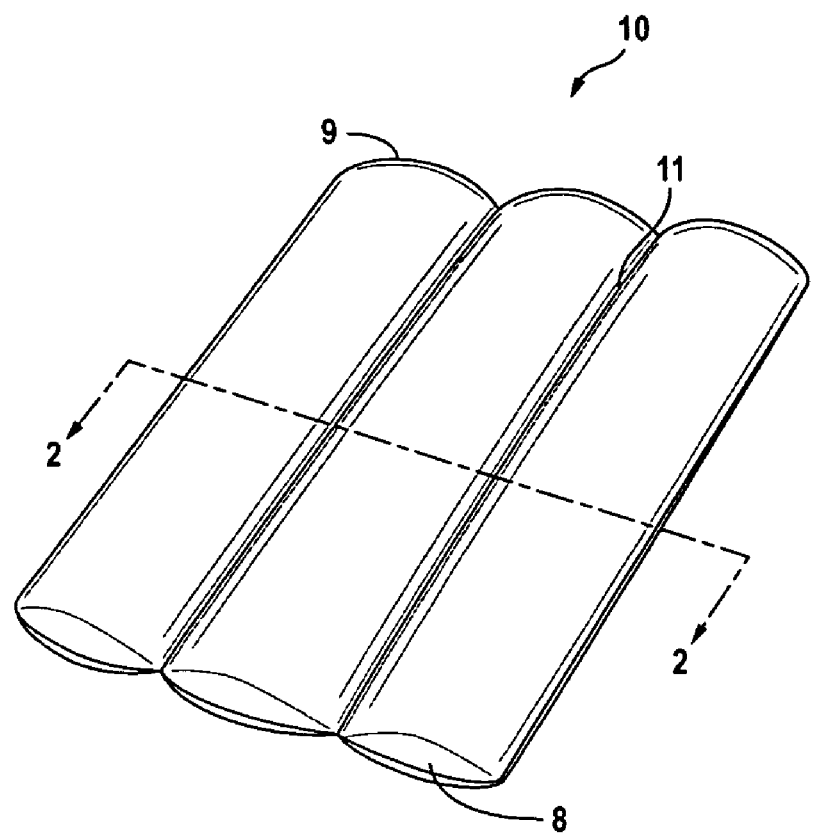
FIG. 1 is a perspective view of a typical bedding product of the prior art.
Figure 2:
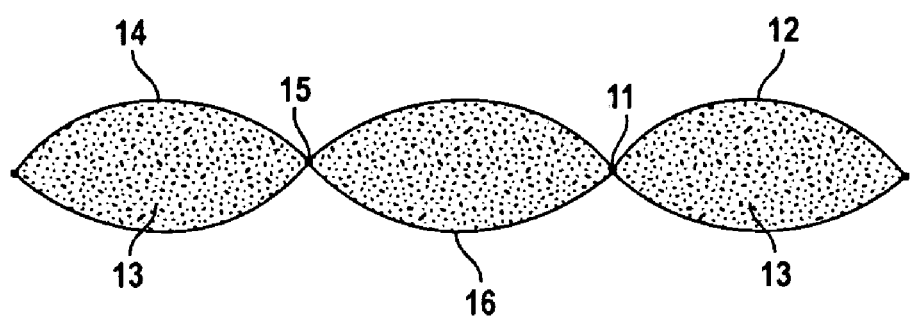
FIG. 2 is a side cross sectional view taken along line 2-2 of FIG. 1.

As noted previously, prior art bedding products such as those shown in FIG. 1 are able to maintain fill material throughout the bedding product's interior by providing stitching 11. Thus, if one was to grab bedding product 10 by corner 9 and pick this product up from a floor or other supporting surface, fill material 13 would congregate at corner 8 leaving the bedding product at corner 9 depleted of such fill material. This is a particular problem when using chopped memory foam that is quite heavy and dense. However, in providing stitching 11, peak 14 and valley 15 are created making bedding product 10 less than ideal. Certainly, such a product, even when used as a pet bed, would be found to be less than an optimum sleeping surface.

Figure 3:
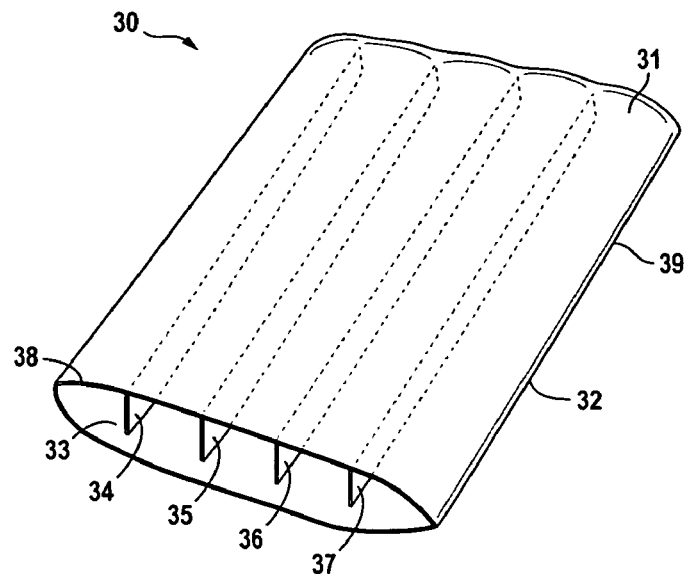
FIG. 3 is a perspective view of the bedding product of the present invention showing an opening for receipt of appropriate fill material.
Figure 4:
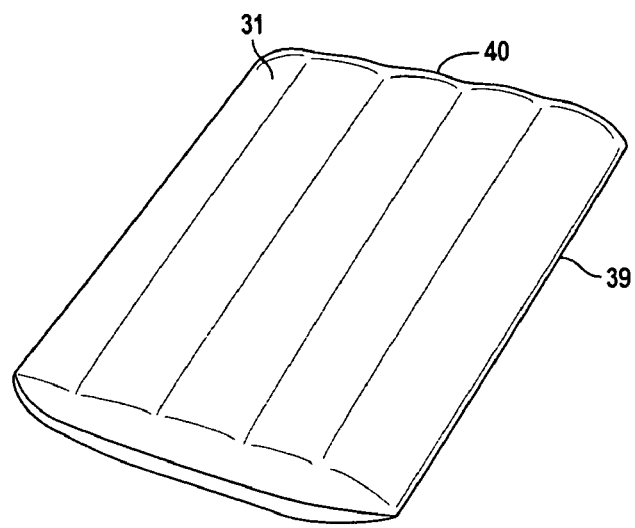
FIG. 4 is a perspective view of the bedding product of FIG. 3 once appropriately filled and closed.

In overcoming the problems provided above, reference is made to FIG. 3 showing present bedding product 30. Bedding product 30 comprises upper fabric layer 31 and lower fabric layer 32 and a peripheral edge 39 joining upper and lower fabric layers 31 and 32 thus defining the shape of bedding product 30. Selectively closeable opening 33 is configured on one of the peripheral edges noting that, ideally, bedding product 30 defined by peripheral edge 39 is substantially rectangular. Once appropriate chopped memory foam has been introduced within opening 33, closure 38 is provided such as a zipper or hook and loop fastener for completing peripheral edge 39 as shown in FIG. 4.

The improvement defining the present invention comprises providing a plurality of barriers 34, 35, 36 and 37 extending proximate opening 33 to approximately the extent of said upper and lower fabric layers 31 and 32 at opposing peripheral edge 40.

It is noted from reference to FIG. 3 that barriers 34, 35, 36 and 37 are substantially rectangular in shape and are connected to both upper fabric layer 31 and lower fabric layer 32 by, for example, stitching these barriers to these fabric layers. The barriers are of a height A (FIG. 5) approximately equal to the thickness of the bedding product once filled with compressible fill material 13 substantially preventing fill material migration between sub volumes 45, 50, etc., created by said barriers. The fabric layers themselves, as well as the barriers can be composed of the same or different materials and can be non-woven synthetics or woven natural fibers such as cotton.

In practice, suitable fill material, specifically chopped or aggregated recycled memory foam would be introduced through opening 33 and into each channel 45, 50, etc., created by barriers 34, 35, 36 and 37. Opening 33 would then be closed creating the bedding product shown in FIG. 4. Because barriers 34, 35, 36 and 37 maintain the appropriate spacing between upper and lower fabric layers 31 and 32, once the fill material has been introduced within pillow 30, peaks and valleys such as 14 and 15 of FIG. 3 are greatly reduced and yet the fill material remains in place throughout the entire internal volume of bedding product 30.

Figure 5:
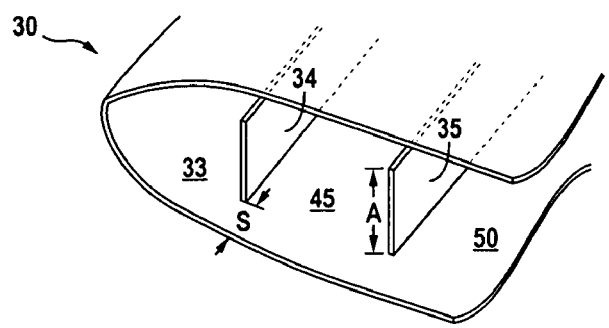
FIG. 5 is a partial perspective end view of the bedding product of the present invention.

As a preferred embodiment, reference is further made to FIG. 5. In this regard, it is noted that barriers 34, 35, 36 and 37 generally extend within pillow 30 as parallel rectangular elements. As further noted, in order to improve closure and fill characteristics of bedding product 30, barriers 34, 35, 36 and 37 begin not at opening 33 but spaced from that opening a short distance S. As noted, each barrier 34, 35, 36 and 37 can be sewn to upper and lower fabric layers 31 and 32 in order to maintain their positioning within the internal volume of bedding product 30.

Finally, as noted, that the present invention is directed to the use of chopped or otherwise particulate pieces of recycled memory foam. Such fill material is ideal for a number of reasons. Firstly, recycled materials are more environmentally friendly and much cheaper than solid blocks of such material. When used as a pet bed, a solid block of memory foam would make such a product prohibitively expensive. Waste memory foam is generally quite available as it created from making foam pillows, mattresses and other similar products and the use of recycled materials provides for a cushioned highly desirable bedding product, particularly one suited for use as a pet bed.

The invention claimed is:

1. A pet bed comprising an upper fabric layer, a lower fabric layer and a peripheral edge joining said upper and lower fabric layers defining the shape of said pet bed wherein a portion of said peripheral edge is selectively closeable to provide an opening for filling said pet bed, a plurality of barriers extending proximate but spaced from said opening to approximately the extent of said upper and lower fabric layers and which are joined to said upper and lower fabric layers, a chopped memory foam incorporated between said upper and lower layers between said plurality of barriers, said barrier layers being of a width approximately equal to the thickness of the pet bed once filled with said chopped memory foam fill material substantially preventing its migration between sub volumes created by said barriers, said barriers extending substantially parallel to one another, creating substantially rectangularly shaped volumes for receiving and maintaining said chopped memory foam.

2. The pet bed of claim 1 wherein said opening is closeable by use of a zipper or hook and loop fasteners.

3. The pet bed of claim 1 wherein said barriers are comprised of fabric sewn into upper and lower fabric layers.

4. A pet bed comprising rectangularly shaped upper and lower fabric layers joined by a peripheral edge on three sides thereof, a fourth side of said rectangularly shaped upper and lower fabric layers being selectively closeable to provide an opening for filling said pet bed with a chopped memory foam fill material, a plurality of parallel substantially rectangularly shaped barriers extending within said upper and lower fabric layers from a point spaced from said closeable opening to an opposite peripheral edge and joined to said upper and lower fabric layers to create sub chambers within said pet bed, the barrier layers being of a width approximately equal to the thickness of the pet bed once filled with said chopped memory foam fill material substantially preventing fill material migration between sub volumes created by said barriers, said sub chambers filled with chopped memory foam.

5. The pet bed of claim 4 wherein said opening is closeable by use of a zipper or hook and loop fasteners.

6. The pet bed of claim 4 wherein said barriers are comprised of fabric sewn into upper and lower fabric layers.

\* \* \* \* \*